H. N. MOORE.
AUTOMATIC TRAIN PIPE COUPLING.
APPLICATION FILED JUNE 22, 1920.

1,408,378.

Patented Feb. 28, 1922.
3 SHEETS—SHEET 1.

H. N. Moore INVENTOR

BY *Victor J. Evans*

ATTORNEY

WITNESSES

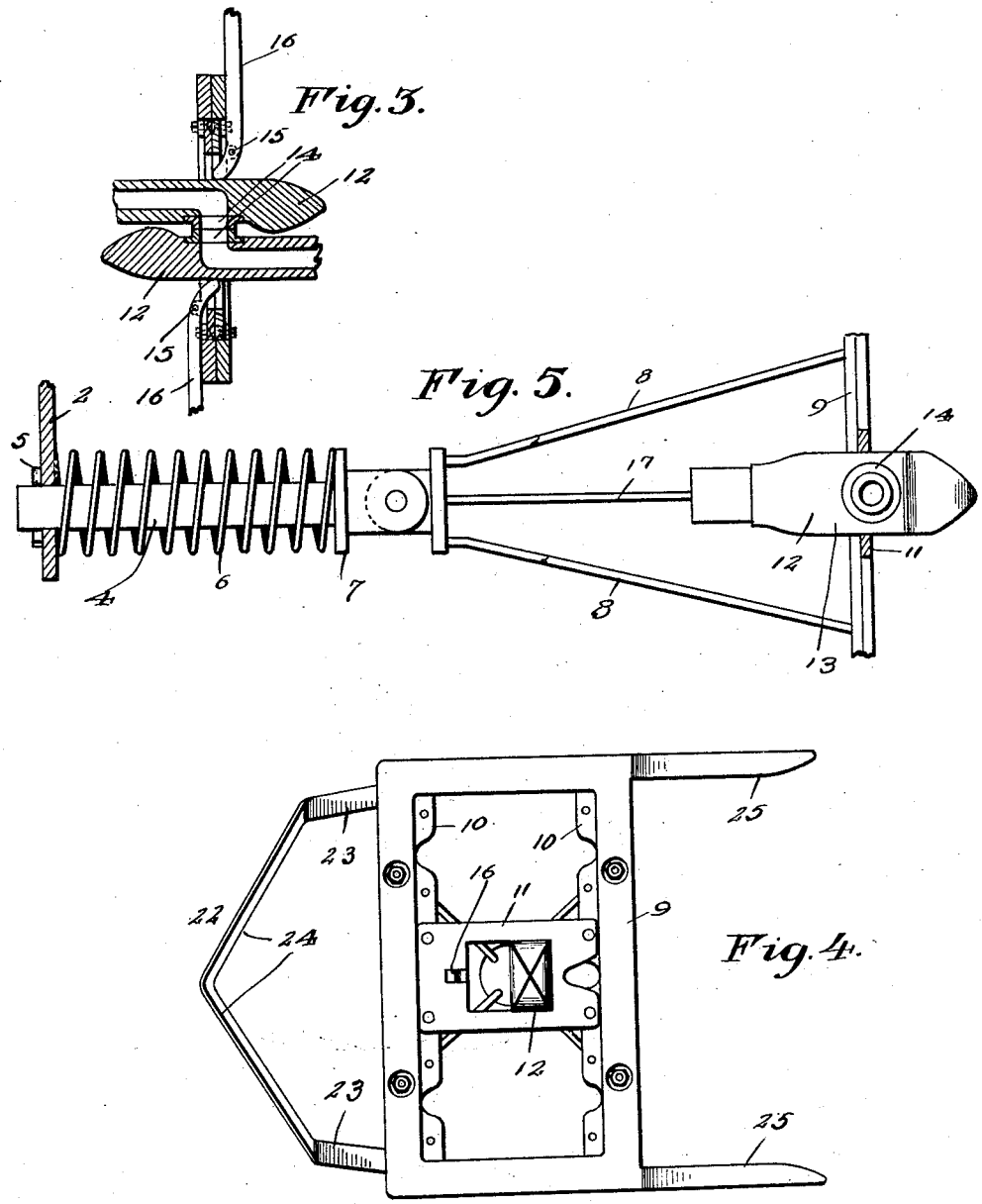

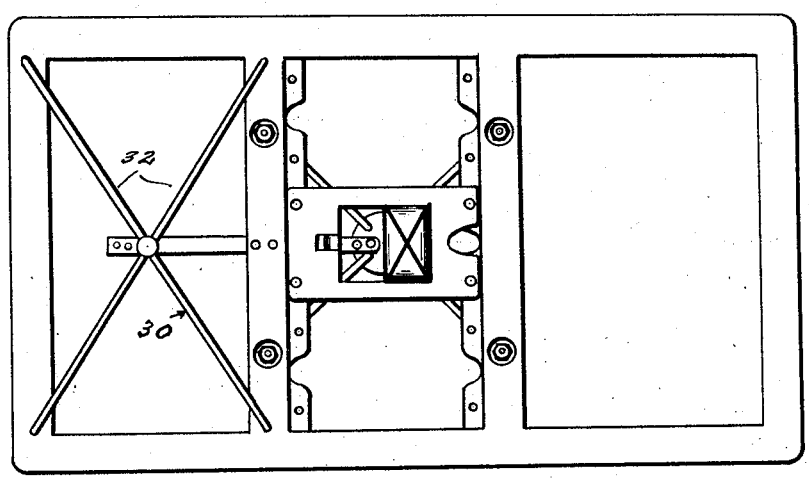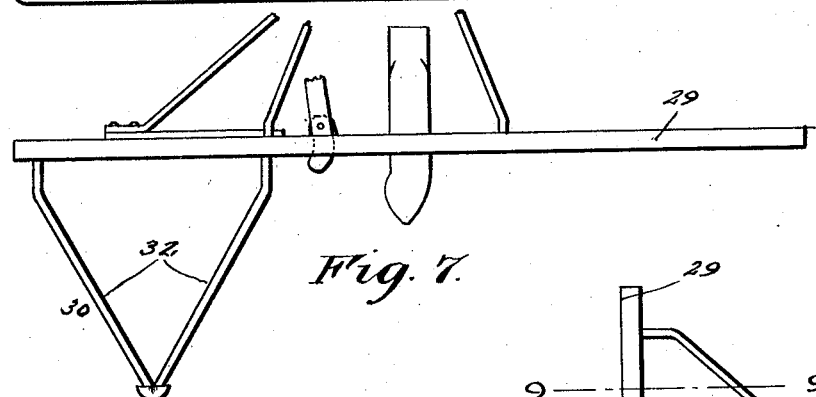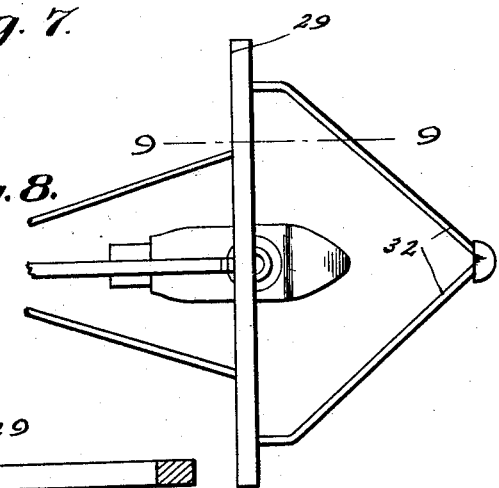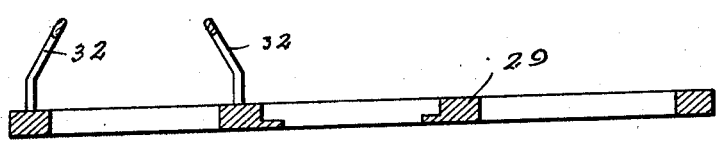

UNITED STATES PATENT OFFICE.

HAROLD N. MOORE, OF KEARNEY, NEBRASKA.

AUTOMATIC TRAIN-PIPE COUPLING.

1,408,378. Specification of Letters Patent. Patented Feb. 28, 1922.

Application filed June 22, 1920. Serial No. 390,775.

*To all whom it may concern:*

Be it known that I, HAROLD N. MOORE, a citizen of the United States, residing at Kearney, in the county of Buffalo and State of Nebraska, have invented new and useful Improvements in Automatic Train-Pipe Couplings, of which the following is a specification.

The present invention has reference to an automatic coupling for the air brake and steam systems of rolling stock.

The primary object is to produce a comparatively simple means wherein the coupler members will be guided one by the other to bring the coupling heads together and to retain the heads positively coupled as long as the coaches are connected.

It is a further object to produce an automatic coupling device for the air brake and steam systems of rolling stock wherein the coupling members will be automatically brought to coupled position when the coaches are connected, and automatically released when the coaches are disconnected, and one wherein the coupler members co-operate with each other in such a manner as to positively bring the coupler heads in proper coupling alignment, while spring influenced means is employed for retaining the coupler heads thus associated.

The foregoing objects, and many others which will appear as the nature of the invention is better understood, may be accomplished by a construction, combination and operative arrangement of parts, such as is disclosed by the accompanying drawings.

In the drawings:—

Figure 3 is a sectional view approximately on the line 3—3 of Figure 1.

Figure 4 is a face view of one of the couplers.

Figure 5 is a sectional view approximately on the line 5—5 of Figure 2.

Figure 6 is a face view of a modified form of coupler.

Figure 7 is a top plan view thereof.

Figure 8 is an edge view thereof.

Figure 9 is a sectional view approximately on the line 9—9 of Figure 8.

Figure 1:
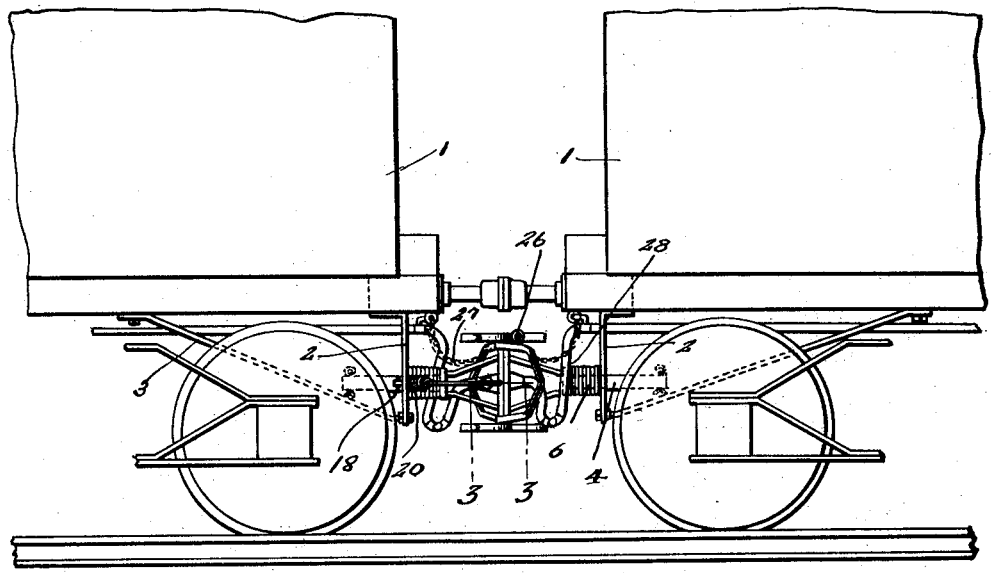
Figure 1 is a side elevation showing two cars coupled together and provided with the improvement.
Figure 2:
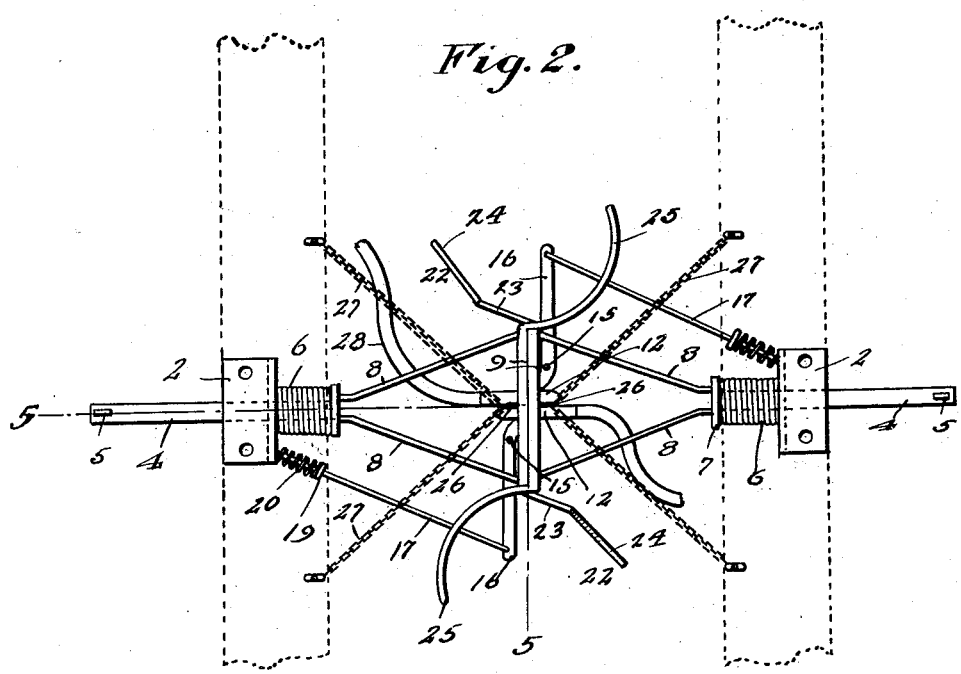
Figure 2 is a top plan view thereof.

While not disclosed by the drawings, my improved automatic train pipe coupler is of a size and is designed for providing coupling connections between the air signal line and the steam signal line of rolling stock, the drawings showing only the coupling means for the air brake system.

To the under face of the outer sill of the frames of cars or coaches 1 I secure the upper angle end of a bracket 2. The bracket, at its lower end has bolted thereto an angle brace member 3. Each of the brackets has a square opening therethrough and each of the openings receives therein the cross sectionally square shank 4 of the improved couplers. The inner end of each of the shanks may be headed or provided with an opening through which passes an element 5 which serves as a contact member for engagement with the inner face of the bracket 2, each of the shanks 5 being influenced in an outward direction from the bracket by a spring 6 that is arranged around the shank but contacts with a flange or enlargement 7 on the outer end of the shank.

From each flange 7 there extends a plurality of angularly disposed arms 8. In the showing of the drawings four such arms are employed, and the said arms connect at their outer ends a substantially rectangular frame 9 thereto. The frame 9 provides the body member or plate of the respective couplers. Each frame 9 has its longitudinal members provided with inturned flanges 10, and to these flanges are bolted or otherwise secured the plates 11 that support the coupler heads 12. Each head 12 has an angle face 13 that has an opening communicating with a port through the head, each of the said openings receiving therein the reduced portion of flanged gaskets 14. Pivotally supported on each of the plates 11, opposite each of the coupler heads 12, as at 15 is a lever 16. The lever is directed inwardly between two of the arms 8 of the respective frames 9, and has connected loosely to its inner end a link 17. The link passes through an opening in the bracket 2 and is held on the bracket by a contact member 18 which may be in the nature of a cotter pin and which engages with the inner face of the bracket. On each of the links 17 there is a flange or enlargement 19, and also on each of the links and exerting a pressure between the respective brackets 2 and the flanges on the said links is a pressure spring 20. When the coupler members are brought one against the other and the gaskets or coupler heads arranged in co-operating engagement, the said coupler members will be moved inwardly to their respective coaches against the tension of the spring 6. This will cause the links 17 to assume an outward angle with respect to the brackets on which they are loosely arranged, and this angle causes the swinging of the levers 17 to bring the said levers into contacting engagement with the outer and angle faces 21 of the respective coupler heads 12, and this pressure is at all times sufficient to retain the heads positively coupled.

On the diametrically opposed edges of the respective frames 9 are guide members 22. In the preferred embodiment of the invention the guide members each comprise two angularly disposed elements 23 that, at their outer ends are provided with inwardly inclined extensions 24 that are connected at their meeting points, thus the guide members are substantially V-shaped in plan. The guide members are designed to be received in a socket. The socket in the preferred embodiment of the improvement comprises two spaced outwardly curved fingers 25 that are arranged on the edge of the frame 9 opposite that provided with the guide. The fingers are spaced a sufficient distance apart to snugly receive therebetween the guides or directing elements 22 of the respective plates and the slightly angular inner portions of the fingers and of the elements 23 of the guides contact with the opposite edges of the frame 9 when the coupling members are associated.

Preferably the plates at the center and upon the inner faces thereof have at their upper edges each an eye 26, and to these eyes are connected angularly disposed flexible sustaining elements 27. The flexible hose 28 connected to the main air line is directed between two of the arms 8 and connected to the pipe end of the respective coupler heads 12.

If desired, and as indicated by the dotted lines in the drawings the arms 8 of the frames 9 may be hingedly connected to the shanks 4.

In the modified form of the improvement the construction is substantially similar to that previously described, except that the frames 29, which correspond to the frame 9 have each at their diametrically opposed ends sockets for receiving their guide members 30 which are formed by simply providing the frames with substantially rectangular openings 31. The guide members comprise four equi-distantly spaced outstanding elements 32 that converge toward each other, as at 33 and are connected at their meeting ends. The straight portions 32 of the guide members contact with the inner walls provided by the socket 31 when the puirinadal outer or nose portion of the guide enters the socket. In each instance the contacting engagement between the guides and the elements on the frames which receive the guides for a co-acting engagement with each other so that vertical or lateral displacement of the respective frames when the couplers are associated will be entirely overcome.

It is believed that the foregoing description, when taken in connection with the drawings will fully set forth to those skilled in the art to which such inventions relate, that I have produced a comparatively simple, thoroughly effective means for automatically coupling the heads of the pipe elements in the air brake line of a railway system and have overcome the liability to injury and loss of life occasioned by the manual coupling of such devices as well as one which will accommodate itself to every jerk or strain to which the rolling stock is subjected. The improvement not only automatically couples the air brake line, the air signal line or the steam line, but also when the couplers for the cars are unlocked, the coupling elements of my improvement will be readily disconnected by the movement of one of the cars away from the other car. It is to be further understood that the drawings illustrate merely satisfactory embodiments of the improvement as the same now appears to me, and that I am entitled to all such changes from the showing and from the description as fall within the scope of my claims.

It should be stated that the plates 11 which carry the coupler heads may, if desired, be susceptible to a slight lateral movement on the frames 9, so that the spring influenced levers not only tend to swing the frames toward each other but acting directly on the coupler heads will slightly move the same into contacting relation and compress the gaskets in the mouths of the said coupler heads.

Having thus described the invention, what I claim is:—

1. In a train line or similar coupling means, the combination of two cars; of depending brackets at the confronting ends of the cars, a frame arranged outward of each bracket, a shank therefor guided through the respective brackets, spring means influencing the shanks to move the latter and the frames carried thereby outward of the brackets, means for limiting such movement, co-operating guides and sockets between the respective frames, a coupler head on each of the frames connected with the fluid line pipe and having a compressible gasket at the mouth thereof, each of said heads having opposite beveled faces, a lever pivoted on each of the frames opposite the mouth of the coupler heads, and spring influenced links between the levers and the respective brackets exerting a pressure against the levers to swing the same on their pivots to bring the opposite ends thereof against the coupler heads to force the latter together and compress the gaskets therebetween.

2. In a train line or similar coupling means, the combination of two cars having depending brackets at the confronting ends thereof, and brace means for said brackets, of a frame arranged outward of each bracket, flexible sustaining means between the car and frame, slotted plates carried one by each of the frames, a coupler head supported in the plates and connected with the fluid line pipe of the car, guide means for the respective frames designed to co-operate with means on the other frame, when the frames are brought toward each other to bring the coupler heads into coupling position, a spring influenced shank supported on the respective brackets for each of the frames, and arms between the shanks and frames, a lever pivoted to each of the plates opposite the mouth of the coupler head thereon, a link loosely supported on each of the brackets and connected one to each of the levers, spring means for influencing the links in one direction, and whereby to swing the levers on their pivots to cause the same to contact with the coupler heads to move the heads laterally on the frame toward each other for forcing the gaskets on said heads into compressing engagement.

In testimony whereof I affix my signature.

HAROLD N. MOORE.